United States Patent Office 3,801,667
Patented Apr. 2, 1974

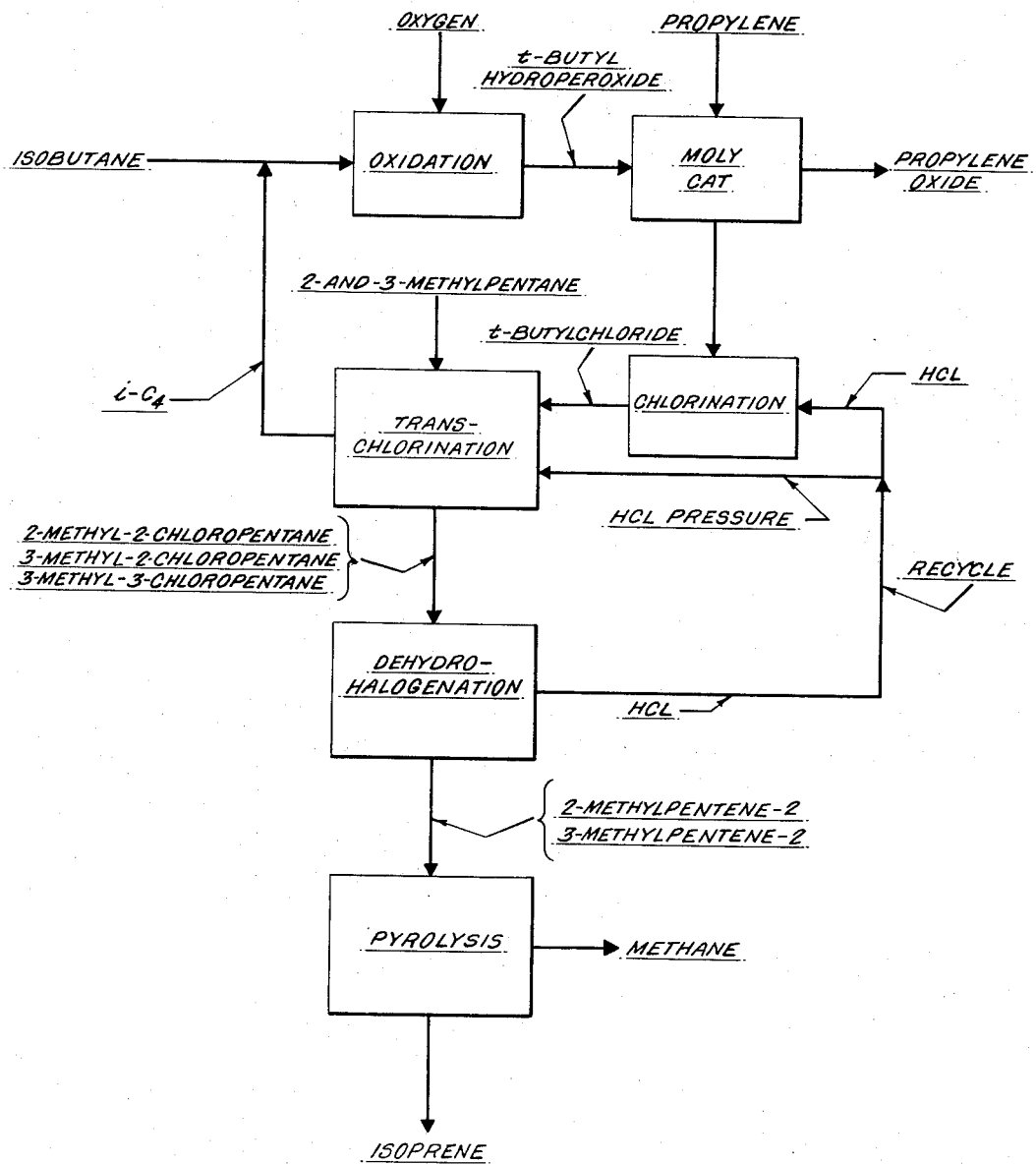

3,801,667
CYCLIC ISOPRENE PROCESS
Abraham Schneider, Philadelphia, Pa., assignor to Sun Research and Development Co., Philadelphia, Pa.
Filed Nov. 9, 1971, Ser. No. 196,938
Int. Cl. C07c 11/18
U.S. Cl. 260—680 C  3 Claims

ABSTRACT OF THE DISCLOSURE

A multi-step synthesis for the production of isoprene is provided wherein certain by-products are recycled in order to achieve a balanced, economical process. The process is principally characterized by the steps of oxidizing isobutane to form t-butyl hydroperoxide which is reacted with propylene to give t-butyl alcohol and the valuable by-product propylene oxide. The alcohol, after conversion to t-butyl chloride is reacted with methylpentanes to give isobutane and methylchloropentanes. These latter compounds are then dehydrochlorinated to yield HCl and methylpentenes which are pyrolyzed to form isoprene.

The isobutane co-produced with the methylchloropentanes is desirably recycled to the first stage oxidation step, while the HCl formed in the next-to-last step may be employed in the further formation of t-butyl chloride.

BACKGROUND OF THE INVENTION

This invention relates to a process for the production of isoprene and propylene oxide. More particularly, this invention relates to a novel, multi-step process for the preparation of isoprene and, as a by-product, propylene oxide, characterized in that isobutane, propylene nad methylpentanes are employed as the principal starting materials; and further characterized in that certain of the by-products are recycled in an effective manner to provide a balanced, economical process.

PRIOR ART

Known prior art which appears relevant to each of the steps of this process discussed hereinbelow is as follows:

Step 1
I&EC, vol. 53, 655 (1961), discussed in the description of Step 1, below.

Step 2
U.S. Pat. No. 3,418,340, which describes the process of reacting t-butylhydroperoxide with propylene over a molybdenum catalyst to give t-butyl alcohol and propylene oxide.

Step 3
The process of reacting t-butyl alcohol with a chlorinating agent to produce t-butylchloride is conventional in the art.

Step 4
U.S. Pat. No. 2,831,036, which describes the transchlorination of methylpentanes with t-butylchloride to form methylchloropentanes and isobutane, utilizing different catalyst systems.

Step 5
U.S. Pat. No. 3,247,277, which teaches the general process of dehydrochlorinating methylchloroalkanes in the presence of iron catalysts to produce methylalkenes and HCl.

Step 6
U.S. Pat. No. 3,388,183, which describes one method of pyrolyzing methylpentenes to form isoprene and methane.

DESCRIPTION OF THE DRAWING

FIG. 1 is a schematic diagram which illustrates one preferred embodiment of this process which corresponds to the steps set forth below.

SUMMARY OF THE INVENTION

The novel process of this invention may be illustrated by the following equations:

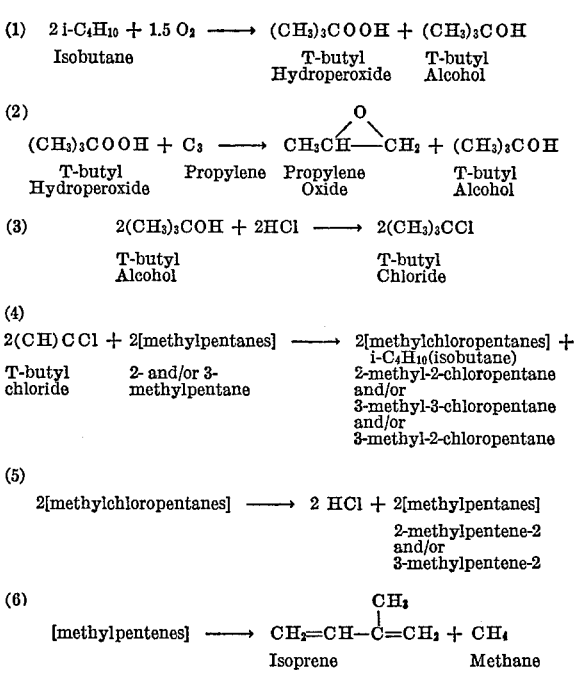

DESCRIPTION OF THE INVENTION

Step 1

The oxidation of isobutane to produce t-butylhydroperoxide and t-butyl alcohol is well known in the art, as described for example in I & EC, vol. 53, p. 655 (1961). Thus, this reaction may conveniently be carried out by the liquid phase oxidation of two moles of isobutane with one and one-half moles of oxygen at a temperature of about 130 to 140° C. and a pressure of 500 to 700 p.s.i. to produce a mixture of t-butylhydroperoxide and t-butyl alcohol. This mixture may readily be separated by distillation and each of the products recovered for use in subsequent steps.

Step 2

The t-butylhydroperoxide obtained in Step 1 is then reacted with propylene in the presence of a molybdenum catalyst to provide propylene oxide and t-butyl alcohol. See, for example, U.S. Pat. 3,428,340, incorporated herein by reference, wherein propylene is reacted with an organic hydroperoxide such as t-butylhydroperoxide at temperatures of from about −20° C. to 200° C. in the presence of a metallic epoxidation catalyst such as molybdenum octanoate to provide propylene oxide and a lower alkanol such as t-butyl alcohol.

The propylene oxide, following separation from the t-butyl alcohol, may then be recovered as a valuable commercial by-product.

Step 3

The combined t-butyl alcohol obtained in Steps 1 and 2 is then chlorinated in a conventional manner, preferably by contact with aqueous hydrochloric acid solution, to form t-butyl chloride for use in the following transchlorination step.

Step 4

The above-described t-butyl chloride is then reacted with a 2- or 3-methylpentane, or more desirably a mixture of 2- and 3-methylpentanes, in the manner described in U.S. Pat. 2,831,036, wherein 96 percent $H_2SO_4$ is employed as the catalyst at a temperature of from about 0° to 20° C. in an atmosphere of HCl. The resulant product comprises a mixture of chlorinated 2- and 3-methylpentanes, whose exact composition is not critical, and isobutane. This latter product is then desirably recycled to Step 1 to provide additional starting material for the preparation of t-butylhydroperoxide. It will thus be noted that, as a novel and significant feature of this invention, the isobutane remains unchanged in the overall process and thereby plays essentially a "catalytic" role in this novel combination of process steps.

Alternatively, instead of $H_2SO_4$ being employed as the catalyst, as described above, thereby be utilized an $AlCl_3$-olefin complex as the transchlorination catalyst in a manner analogous to that taught in U.S. Pat. 3,247,277 in order to obtain the chlorinated methylpentanes used in the following steps.

Step 5

The mixture of methylchloropentanes obtained in Step 4 is then dehydrochlorinated to provide 2- and 3-methylpentene-2. The dehydrochlorination is conveniently effected by contacting the methylchloropentane mixture with $FeCl_3$ or iron shot at 110° C. in the manner analogous to that described in above-mentioned U.S. Pat. 3,247,277 with reference to methylbutanes. The HCl which is evolved as a by-product of this step may then be recycled to Step 3 for the preparation of additional t-butyl chloride, and/or for use in providing an HCl atmosphere in Step 4.

Step 6

In the final step of this process, the above methylpentenes may then be pyrolyzed in accordance with the teachings of any of U.S. Pats. 3,287,437; 3,529,032; 3,287,438; 3,480,687; 3,388,183; 3,480,688; 3,317,626; 3,296,327 or the like, wherein methylpentenes are cracked at temperatures of from 400 to 900° C. for up to half a second, preferably although not essentially in the presence of a cracking catalyst such as silica-alumina and a cracking promoter such as $H_2S$, HBr, $H_2S$-aromatic hydrocarbon mixture, methylene chloride or the like, to produce a mixture of isoprene and methane, which may then be routinely separated and recovered.

It will be understood from the above description that this process is not limited to any one set of operating conditions for any of Steps 1 to 6, and that it will be recognized by those skilled in the art that the invention thus resides in the order of steps described and the nature of the intermediates and by-products obtained rather than the manner in which these materials are produced. For example, the afore-described process is not intended to be limited solely to t-butylchloride, but may include the corresponding bromide or fluoride as well.

In an alternate embodiment of this process, it is contemplated that isopentane may be employed in the first step in place of isobutane. In this case, the isopentane are desirably oxidized with oxygen under conditions which provide a low conversion per pass yet a high selectivity for the t-amylhydroperoxide. The t-amylhydroperoxide may then be converted to the corresponding t-amyl alcohol in a manner analogous to that described in Step 2 above. That is to say, the t-amylhydroperoxide may be contacted with propylene in the presence of a molybdenum catalyst under the same conditions as described in Step 2 above to provide the t-amyl alcohol.

The t-amyl alcohol may then be converted to t-amyl chloride in the manner described in Step 3 above, and the resulting chloride subjected to hydrogen-halogen exchange with the methylpentanes as taught in Step 4 above, to yield the same methylchloropentanes and isopentane described above. Dehydrochlorination of these methylchloropentanes yields the 2- and 3-methylpentene-2 described in Step 5 above. These latter compounds, when pyrolyzed in accordance with Step 6, again produce isoprene and methane.

The novel process of this invention will now be illustrated by the following examples.

EXAMPLE 1

Step 1

The reaction is carried out in a stainless steel reactor with a 1000 p.s.i.g. pressure rating. The charge consists of 400 grams of isobutane with 1 gram of di-t-butyl peroxide as an initator. The reactor is charged with isobutane and heated to 125° C. Compressed air is then metered into the reactor through a disk filter. After 15 hours at 125° C. the reactor is cooled and the product worked up. The conversion is 50 percent and the yields of t-butylhydroperoxide and t-butyl alcohol are 46 and 44 percent, respectively.

EXAMPLE 2

Step 2

Propylene (0.2 m.), 98 percent t-butylhydroperoxide (0.2 m.) obtained above, and $Mo(CO)_6$ (0.02 g.) are charged into an autoclave and heated 15 minutes at 80° C. After cooling, the reaction mixture is withdrawn from the vessel and analyzed as propylene oxide and t-butyl alcohol. The oxide yield is 93 percent at 96 percent conversion. (B.P.: 36° C.).

EXAMPLE 3

Step 3

In a 500 cc. separatory funnel are placed 74 g. (95 cc., 1 m.) of t-butyl alcohol and 247 cc. (3 m.) of concentrated hydrochloric acid. After shaking, the layers are allowed to separate (fifteen to twenty minutes) and the upper layer is drawn off and washed first with a 5 percent sodium bicarbonate solution, then with water until neutral to moist litmus paper. The chloride is treated with 10 g. of calcium chloride and shaken thoroughly, then transferred to a 125 cc. distilling flask. It is then distilled using a long water condenser. The fraction boiling at 49.5 to 52° C. is identified as t-butyl chloride.

EXAMPLE 4

Step 4

To 1.0 ml. of t-butylchloride obtained in Example 3 (0.83 g.) is added 3.0 ml. (1.9 g.) of a mixture of 2- and 3-methylpentane and 10.0 ml. of 96 percent $H_2SO_4$. The mixture is shaken at 0° C. for 5 minutes, at which time a portion is removed and analyzed; after 15 minutes more a second portion is removed and likewise analyzed. The two portions, and particularly the second, are shown to contain a mixture of 2- and 3-methylchloropentanes (2-methyl-2-chloropentane and 3-methyl-3-chloropentane), together with larger amounts of unreacted starting materials and isobutane as well as traces of isopentane and higher boiling materials. The isobutane is separated and recycled to Step 1 for further oxidation to form t-butylhydroperoxide.

EXAMPLE 5

Step 5

1.2 g. of a mixture of 2-methyl-2-chloropentane and 3-methyl-3-chloropentane is charged into a fractionator kettle. To this mixture is added 0.1 g. of FeCl₃. The mixture is heated to 110° C. and a mixture of HCl, 2-methylpentene-2, and 3-methylpentene-2 is passed overhead to a condenser. The methylpentenes are condensed out, while the HCl is recycled for reaction with the t-butyl alcohol.

EXAMPLE 6

Step 6

An apparatus is prepared consisting of a coil of ¼ inch diameter stainless steel tubing immersed in a bed of fluidized heat transfer powder comprising silica-alumina cracking catalyst, as described in U.S. Pat. 3,-529,032. The heat transfer powder is then heated to temperatures varying from about 600° C. to 675° C. and separate portions of the mixture of methylpentenes obtained in Example 5 is passed through the apparatus admixed with up to 50 mol percent of HBr at rates to provide contact times of about 0.5 seconds. The product in each instance is determined to be a mixture of isoprene and methane.

When H₂S or methylene chloride is substituted for the HBr in the above procedure there is again obtained isoprene and methane.

The invention claimed is:

1. A process for the production of isoprene and propylene oxide comprising the steps of:
   (a) oxidizing isobutane with air or oxygen at elevated temperatures to produce a mixture of t-butylhydroperoxide and t-butyl alcohol, and separating the mixture;
   (b) reacting said t-butylhydroperoxide with propylene in the presence of an epoxidation catalyst to yield propylene oxide and t-butyl alcohol, and recovering the propylene oxide;
   (c) contacting the aforesaid t-butyl alcohol with a halogenating agent to provide a t-butylhalide;
   (d) reacting said t-butylhalide with a methylpentane to produce a methylhalopentane and isobutane, and recycling said isobutane to oxidation step (a) to form additional t-butylhydroperoxide;
   (e) dehydrohalogenating said methylhalopentane to form a methylpentene-2, and a hydrogen halide, and recycling said hydrogen halide to halogenation step (c) to form additional t-butylhalide; and
   (f) pyrolyzing said methylpentene-2 to yield isoprene and methane.

2. The process according to claim 1 wherein the methylpentane of step (d) is a mixture of 2-methylpentane and 3-methylpentane.

3. The process according to claim 1 wherein the halogenating agent of step (c) is a chlorinating agent.

References Cited

UNITED STATES PATENTS

| | | | |
|---|---|---|---|
| 3,470,239 | 9/1969 | Russell | 260—610 |
| 3,418,340 | 12/1968 | Russell | 260—348.5 |
| 2,013,722 | 9/1935 | Wirth | 260—657 |
| 2,831,036 | 4/1958 | Wiese | 260—659 |
| 3,214,480 | 10/1965 | Hoffman | 260—677 XA |
| 3,240,834 | 3/1966 | Kruse et al. | 260—677 XA |
| 3,529,032 | 9/1970 | Frech | 260—680 C |

PAUL M. COUGHLAN, JR., Primary Examiner

U.S. Cl. X.R.

260—348.5 R, 677 XA